UNITED STATES PATENT OFFICE.

WILLARD H. KEMPTON, OF WILKINSBURG, PENNSYLVANIA, ASSIGNOR TO WESTINGHOUSE ELECTRIC AND MANUFACTURING COMPANY, A CORPORATION OF PENNSYLVANIA.

METHOD OF COATING ELECTRIC CONDENSERS.

1,249,770.

Specification of Letters Patent. Patented Dec. 11, 1917.

No Drawing. Application filed April 18, 1917. Serial No. 163,027.

*To all whom it may concern:*

Be it known that I, WILLARD H. KEMPTON, a citizen of the United States, and a resident of Wilkinsburg, in the county of Allegheny and State of Pennsylvania, have invented a new and useful Improvement in Methods of Coating Electric Condensers, of which the following is a specification.

My invention relates to the manufacture of electric condensers composed of laminations of tin foil or other conducting material and intermediate laminations of dielectric material which commonly consists of sheets of paper or other fabric impregnated with an insulating wax.

The object of my invention is to provide a method of coating condensers of the above-indicated character whereby a coating of dense and impervious material may be applied to the condenser, with the aid of heat and without causing deterioration of the dielectric material of the condenser.

Electrostatic condensers, in which the dielectric material is a wax, such as paraffin, chlorinated naphthalene or the like, are deleteriously affected by high temperatures approaching the melting point of the wax composing the dielectric of the condenser. It is, however, highly desirable to provide such condensers with coatings that are impervious to moisture, and the materials which are most suitable for this purpose must be applied or solidified with the aid of heat. Examples of such coating materials are the well known resinous condensation products of phenols and formaldehyde which are liquids or plastic solids in certain stages but are transformed by heat and pressure into hard, infusible, insoluble and water-impervious substances.

According to my present invention, I provide built-up electrostatic condensers and other bodies which are deleteriously affected by heat with coatings of materials of the kind just described, or of any other suitable material which hardens under the influence of heat and pressure, by surrounding the condenser with the coating material and applying heat and pressure in a series of separate stages, the condenser being cooled between the successive heating and pressing steps in order to prevent substantial heating of the dielectric material of the condenser. For example, in applying a coating comprising a phenolic condensation product to a condenser having a dielectric which contains halogenated naphthalene as the waxy material, I provide sheets of the condensation product of the size and shape required to form the coating and I heat the sheets of coating material in any suitable manner, provided that the material is heated quickly enough to prevent substantial hardening of the phenolic condensation product. The two halves or pressure members of a mold of the proper size and shape are heated at the same time as the coating material and the hot plastic sheets are placed in the two halves of the mold. The condenser to be coated is then placed in the mold and enveloped by the sheets of coating material and the mold is placed in a heated press, where heat and pressure are applied for a short time, suitably for about half a minute, the pressure amounting to about 1000 pounds per square inch and the press being heated to from 180° to 225° C. After the condenser is pressed for a short period, it is removed from the press and cooled in a cold press or by the application of blasts of air or other cooling means. When cold, the condenser is returned to the press and heat and pressure are again applied for a short time. The cooling and heating steps are alternated until the phenolic condensation product is completely transformed into its hard and infusible condition, the heat and pressure being interrupted in each heating period before the condenser laminations are overheated.

My process may be applied to any molding operation in which a coating is applied to an object which is deleteriously affected by the amount of heat required in the application of the coating. It is therefore to be understood that my invention is not restricted to the specific materials and manipulations which I have described above but that it comprehends all such modifications and adaptations as fall within the scope of the appended claims.

I claim as my invention:

1. The method that comprises applying a coating substance that is adapted to be hardened by the application of heat and pressure to a body of material that is deleteriously affected by the temperature at which the said coating substance is effectively hardened, applying heat and pressure to the coated body sufficiently to partly harden the coating substance but not sufficiently to deleteriously affect the material composing the said body, cooling the said body and again applying heat and pressure thereto.

2. The method that comprises applying a coating substance containing a phenolic condensation product to a body of material that is deleteriously affected by the temperature at which the said condensation product is effectively hardened, applying heat and pressure to the coated body sufficiently to partially harden the said condensation product but not sufficiently to deleteriously affect the material composing the said body, cooling the said body and again applying heat and pressure thereto.

3. The process of coating an electric condenser that comprises applying a coating material that is adapted to harden under the influence of heat and pressure to a condenser containing a dielectric material that is deleteriously affected by the temperature at which the said coating material is effectively hardened, applying heat and pressure to the coated condenser sufficiently to partially harden the coating material but not sufficiently to deleteriously affect the said dielectric material, cooling the said condenser and again applying heat and pressure thereto.

4. The method of coating an electric condenser that comprises applying to the condenser a coating material that is adapted to be hardened by the application of heat and applying heat to the coated condenser in a plurality of discontinuous steps.

5. The process of coating an electric condenser that comprises applying to the condenser a coating material that is adapted to be hardened by the application of heat and pressure and applying heat and pressure to the coated condenser in a plurality of discontinuous steps.

6. The process of coating an electric condenser that comprises applying to the condenser a coating material that is adapted to be hardened under the influence of heat and pressure, heating and pressing the coated condenser sufficiently to partially harden the coating material but not sufficiently to impair the electrical characteristics of the condenser, cooling the condenser and again applying heat and pressure thereto.

7. The process of coating a condenser that comprises applying a coating containing a phenolic condensation product to a condenser comprising a dielectric material containing a wax and alternately heating under pressure and cooling the said condenser and thereby hardening the phenolic condensation product without deleteriously affecting the electrical properties of the condenser.

In testimony whereof, I have hereunto subscribed my name this 26th day of March, 1917.

WILLARD H. KEMPTON.